(12) United States Patent
Park et al.

(10) Patent No.: US 9,564,670 B2
(45) Date of Patent: Feb. 7, 2017

(54) BATTERY MODULE

(71) Applicant: SAMSUNG SDI CO., LTD., Yongin-si, Gyeonggi-do (KR)

(72) Inventors: Ju-Yong Park, Yongin-si (KR); Seung-Woo Yang, Yongin-si (KR); Jae-Lim Ryu, Yongin-si (KR)

(73) Assignee: SAMSUNG SDI CO., LTD., Yongin-Si, Gyeonggi-Do (KR)

( * ) Notice: Subject to any disclaimer, the term of this patent is extended or adjusted under 35 U.S.C. 154(b) by 69 days.

(21) Appl. No.: 14/617,566

(22) Filed: Feb. 9, 2015

(65) Prior Publication Data
US 2015/0236385 A1 Aug. 20, 2015

(30) Foreign Application Priority Data
Feb. 17, 2014 (KR) ........................ 10-2014-0017719

(51) Int. Cl.
*H01M 10/50* (2006.01)
*H01M 10/6556* (2014.01)
*H01M 10/6568* (2014.01)
*H01M 10/6554* (2014.01)
*H01M 10/613* (2014.01)
*F28F 3/08* (2006.01)
*F28F 3/12* (2006.01)
*F28D 21/00* (2006.01)

(52) U.S. Cl.
CPC ........... *H01M 10/6556* (2015.04); *F28F 3/08* (2013.01); *F28F 3/12* (2013.01); *H01M 10/613* (2015.04); *H01M 10/6554* (2015.04); *H01M 10/6568* (2015.04); *F28D 2021/0043* (2013.01)

(58) Field of Classification Search
CPC ........ F28D 2021/0043; F28F 3/08; F28F 3/12; H01M 10/613; H01M 10/6554; H01M 10/6556; H01M 10/6568
See application file for complete search history.

(56) References Cited

U.S. PATENT DOCUMENTS

| | | | | |
|---|---|---|---|---|
| 2011/0139397 | A1* | 6/2011 | Haussmann | ....... B60H 1/00278 165/43 |
| 2011/0300428 | A1* | 12/2011 | Sohn | .................. H01M 2/1066 429/120 |

FOREIGN PATENT DOCUMENTS

| | | |
|---|---|---|
| KR | 2011-0130313 A | 12/2011 |
| KR | 2011-0132793 A | 12/2011 |
| KR | 2012-0102325 A | 9/2012 |

* cited by examiner

*Primary Examiner* — Patrick Ryan
*Assistant Examiner* — Ben Lewis
(74) *Attorney, Agent, or Firm* — Lee & Morse, P.C.

(57) ABSTRACT

A battery module including a plurality of battery cells aligned in a first direction; a heat exchange member supporting a bottom surface of each battery cell of the plurality of battery cells, the heat exchange member exchanging heat with the plurality of battery cells, wherein the heat exchange member includes a first refrigerant flow path and a second refrigerant flow path, the first refrigerant flow path is adjacent to the bottom surface of each battery cell, and the second refrigerant flow path is spaced apart from the first refrigerant flow path and below the first refrigerant flow path.

19 Claims, 8 Drawing Sheets

BATTERY MODULE

CROSS-REFERENCE TO RELATED APPLICATION

Korean Patent Application No. 10-2014-0017719 filed on Feb. 17, 2014, in the Korean Intellectual Property Office, and entitled: "BATTERY MODULE," is incorporated by reference herein in its entirety.

BACKGROUND

1. Field

Embodiments relate to a battery module.

2. Description of the Related Art

A high-power battery module using a non-aqueous electrolyte with high energy density has been considered. The high-power battery module may be configured as a large-capacity battery module manufactured by connecting a plurality of battery cells in series so as to be used in driving motors of devices requiring high power, e.g., electric vehicles and the like. A battery pack can be configured by electrically connecting such a plurality of battery modules to one another.

SUMMARY

Embodiments are directed to a battery module.

The embodiments may be realized by providing a battery module including a plurality of battery cells aligned in a first direction; a heat exchange member supporting a bottom surface of each battery cell of the plurality of battery cells, the heat exchange member exchanging heat with the plurality of battery cells, wherein the heat exchange member includes a first refrigerant flow path and a second refrigerant flow path, the first refrigerant flow path is adjacent to the bottom surface of each battery cell, and the second refrigerant flow path is spaced apart from the first refrigerant flow path and below the first refrigerant flow path.

The heat exchange member may include a plurality of layers formed by sequentially laminating first to fifth plates, the first plate may be adjacent to the bottom surface of each battery cell, the first flow path may be in the second plate, the third plate may be between the second and fourth plates, the second refrigerant flow path may be in the fourth plate, and the fifth plate may be beneath the fourth plate.

Outer circumferential sides of the first to fifth plates may be integrally connected through welding.

The heat exchange member may have an inlet into which a refrigerant is flowable and an outlet through which the refrigerant is dischargeable to an outside of the heat exchange member, the outlet may be adjacent to the bottom surface of each battery cell and at a side of the heat exchange member, and the inlet may be below the outlet and spaced apart from the outlet.

The first refrigerant flow path may continuously extend from one end thereof to another end thereof, the one end of the first refrigerant flow path being connected to the outlet, and the second refrigerant flow path may continuously extend from one end thereof to another end thereof, the one end of the second refrigerant flow path being connected to the inlet.

The third plate may include a through-hole extending from an upper surface thereof to a lower surface thereof, and the other ends of the first and second refrigerant flow paths may be connected to the through-hole in the third plate.

The second plate may include an outlet through which a refrigerant is dischargeable to an outside of the heat exchange member, the fourth plate may include an inlet into which the refrigerant is flowable, and a phase of the refrigerant is changeable by passing from the inlet to the outlet.

Refrigerant in a liquid phase may be flowable in the heat exchange member through the inlet and along the second refrigerant flow path, and the phase of the refrigerant may be changeable in the first refrigerant flow path such that both liquid and gas phases are flowable in the first refrigerant flow path.

The first refrigerant flow path may include a straight line shaped first main path connected to an outlet, and one or more first bridge paths connected to and extending in an orthogonal direction from the first main path, and the second refrigerant flow path may include a straight line shaped second main path connected to an inlet and at a position underlying the first main path, and one or more second bridge paths connected to and extending in an orthogonal direction from the second main path.

The first and second main paths may extend in a second direction in parallel with a lengthwise direction of the bottom surface of the battery cell, the second direction being perpendicular to the first direction.

The one or more first bridge paths may include a plurality of first bridge paths that extend in the first direction and that are spaced apart from each other, and the one or more second bridge paths may include a plurality of second bridge paths that extend in the first direction and that are spaced apart from each other, the one or more second bridge paths underlying the one or more first bridge paths.

The third plate may include a through-hole extending from an upper surface to a lower surface thereof, one end of the one or more first bridge paths may be connected to the first main path, one end of the one or more second bridge paths may be connected to the second main path, and other ends of the one or more first bridge paths and the one or more second bridge paths may be connected to one another via the through hole.

The battery module may further include a refrigerant wherein the refrigerant flows into the heat exchange member through an inlet to flow along the second refrigerant flow path, the refrigerant flows to the first refrigerant flow path through the through-hole, and the refrigerant exchanges heat with the bottom surface of each battery cell, a phase of the refrigerant being changed in the first refrigerant flow path.

The first to fifth plates may include first to fifth guide portions at sides thereof, and the first to fifth guide portions may be at positions that are aligned with each other, the first to fifth guide portions guiding positions of the first to fifth plates.

At least one portion of the first or second refrigerant flow path may have a wave or zigzag shape.

The first refrigerant flow path may include a straight line-shaped first main path that extends in parallel with a lengthwise direction of the bottom surface of each battery cell, and one or more first bridge paths that are connected to the first main path and that extend the first direction from the first main path, and the second refrigerant flow path may include a straight line shaped second main path that extends in parallel with the lengthwise direction of the bottom surface of each battery cell and that is aligned with the first main path, and one or more second bridge paths that are connected to the second main path and that extend in the first direction from the second main path.

The one or more first and second bridge paths may have the wave or zigzag shape, each of the first and second bridge paths may include a convex portion protruding in a second direction that is perpendicular to the first direction, and a concave portion alternately arranged with the convex portion, and the convex portion of the first refrigerant flow path may be at a position overlying the concave portion of the second refrigerant flow path.

At least one of the first to fifth plates may include aluminum.

BRIEF DESCRIPTION OF THE DRAWINGS

Features will be apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

It will be understood that when an element is referred to as being "between" two elements, it may be the only element between the two elements, or one or more intervening elements may also be present.

In addition, when an element is referred to as being "on" another element, it can be directly on the another element or be indirectly on the another element with one or more intervening elements interposed therebetween. Also, when an element is referred to as being "connected to" another element, it can be directly connected to the other element or be indirectly connected to the other element with one or more intervening elements interposed therebetween.

Figure 1A:
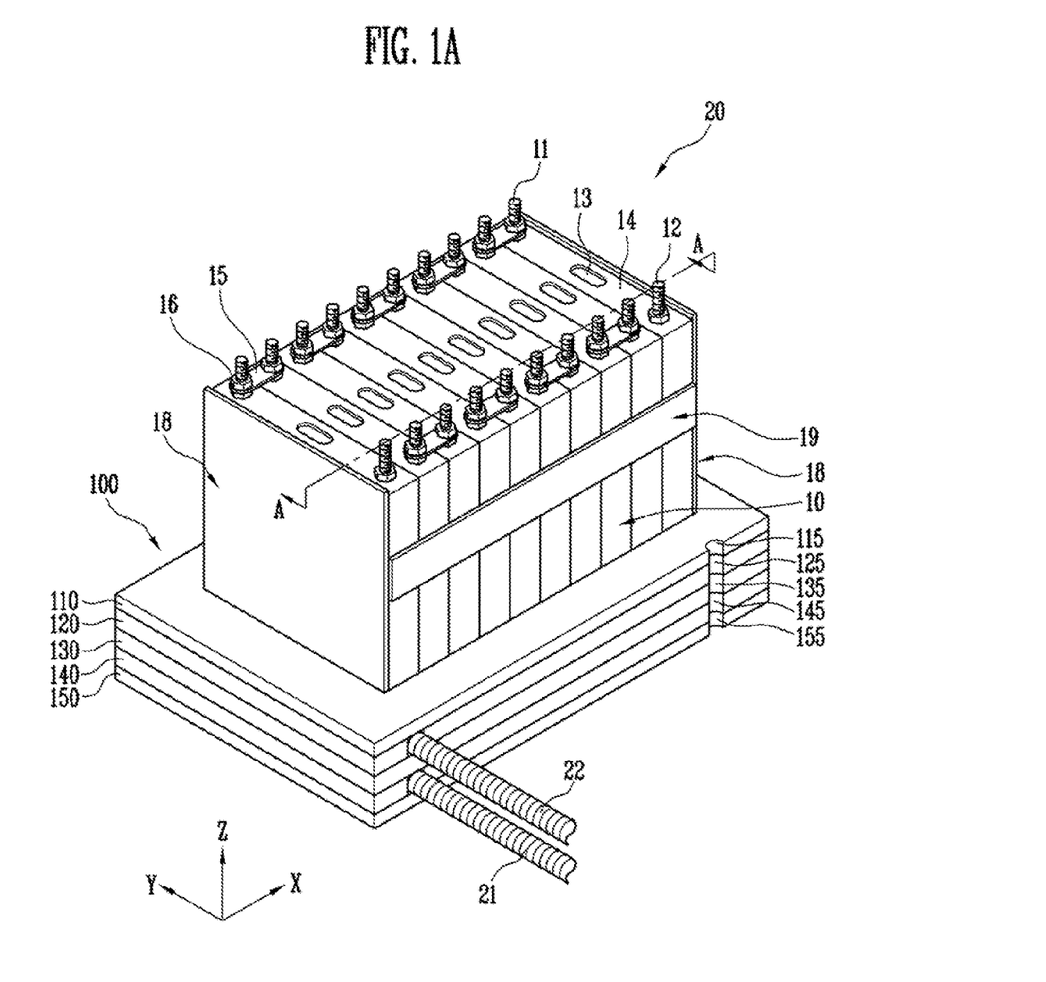
FIG. 1A illustrates a perspective view of a battery module according to an embodiment.
Figure 1B:
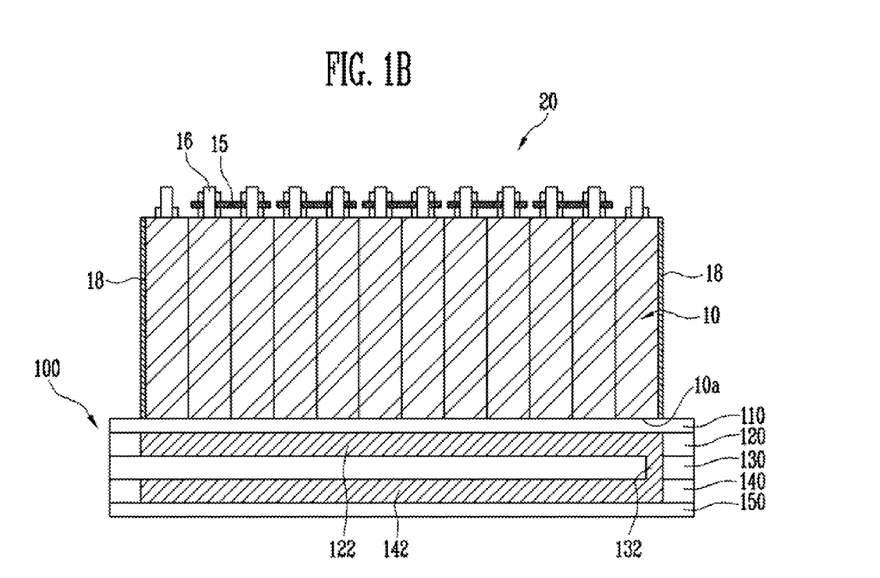
FIG. 1B illustrates a sectional view taken along line A-A of FIG. 1A.

FIG. 1A illustrates a perspective view of a battery module according to an embodiment. FIG. 1B illustrates a sectional view taken along line A-A of FIG. 1A.

The battery module 20 according to this embodiment may include a plurality of battery cells 10 aligned in a first direction, fixing members 18 and 19 fixing the battery cells 10, and a heat exchange member 100 supporting bottom surfaces 10a of the battery cells 10 and exchanging heat with the battery cells 10. The heat exchange member 100 may have first and second refrigerant flow paths 122 and 142, which are paths through which a refrigerant is flowable. The first refrigerant flow path 122 may be adjacent to the bottom surfaces 10a of the battery cells 10, and the second refrigerant flow path 142 may be spaced apart from the first refrigerant flow path 122, e.g., below the first refrigerant flow path 122. For example, the first refrigerant flow path 122 may be between the battery cells 10 and the second refrigerant flow path 142.

The battery cells 10 may each include a battery case, and an electrode assembly and an electrolyte, which are accommodated in the battery case. The electrode assembly and the electrolyte may generate energy through an electrochemical reaction therebetween, and the battery case may be sealed with a cap assembly 14. The cap assembly 14 may be provided with positive and negative electrode terminals 11 and 12 having different polarities from each other, and a vent 13. The vent 13 may be a safety mechanism of the battery cell 10, and may act as a passage through which gas generated inside the battery cell 10 is exhausted to an outside of the battery cell 10. Positive and negative electrode terminals 11 and 12 of adjacent battery cells may be electrically connected through a bus-bar 15, and the bus-bar 15 may be fixed to the positive and negative electrode terminals 11 and 12 by a nut 16 or the like.

The battery cell 10 may reversibly generate electric energy. The plurality of battery cells 10 may be aligned or arranged in the first direction (X-direction) so that wide surfaces of the battery cells face each other and face the first direction, and may be fixed by the fixing members 18 and 19, thereby forming the battery module 20. The battery module 20 may be used as a power source of various electronic devices according to the number of battery cells 10 connected to each other and the serial or parallel connection between the battery cells 10.

The fixing members 18 and 19 may fasten together the plurality of battery cells 10 to be physically fixed. The fixing members 18 and 19 may include, e.g., a pair of end plates 18 respectively provided at the outermost sides of the plurality of aligned battery cells 10 so that wide surfaces of the battery cells 10 face each other, and a connecting plate that connects the pair of end plates 18 to each other.

A battery module may include a plurality of battery cells, and a large amount of heat may be generated as the battery cells are charged/discharged. The heat may be accumulated in the battery cell, and may accelerate the degradation of the battery cell and lower electrical efficiency. In a severe case, the heat may raise safety concerns. For example, the heat may be especially problematic in the battery module that acts as a high-power power source. Accordingly, a cooling device may be provided to help control the heat.

The battery module according to this embodiment may include a heat exchange member that efficiently exchange heat with the battery cells and that uniformly refrigerates or cools the battery cells without any or appreciable difference in temperature between the battery cells. Further, a refrigerant for refrigerating or cooling the battery module may be efficiently used, so that it is possible to reduce a unit cost and operation cost of the battery module and to help improve the lifespan of the battery module by reducing and/or preventing the degradation of the battery cells.

Referring to FIGS. 1A and 1B, the battery module 20 according to this embodiment may include the heat exchange member 100 on the bottom surfaces 10a of the battery cells 10. The heat exchange member 100 may include a plurality of layers, e.g., formed by sequentially laminating first to fifth plates 110, 120, 130, 140, and 150. The first plate 110 may be adjacent to the bottom surface 10a of the battery cell 10. The first and second refrigerant flow paths 122 and 124 may be respectively in the second and fourth plates 120 and 140. The third plate 130 may be between the second and fourth plates 120 and 140. The fifth plate 150 may be beneath the fourth plate 140. For example, the first to fifth plates 110, 120, 130, 140, and 150 may be sequentially aligned from the battery cells 10 toward a bottom of the battery module 20.

Outer circumferences or outer circumferential sides of the sequentially laminated first to fifth plates 110, 120, 130, 140, and 150 may be integrally connected through welding. For example, first to fifth guide portions 115, 125, 135, 145, and 155 may be provided at sides of the first to fifth plates 110, 120, 130, 140, and 150. The first to fifth guide portions 115, 125, 135, 145, and 155 may be provided at positions corresponding to or aligned with each other, and may guide or align the positions of the first to fifth plates 110, 120, 130, 140, and 150. The first to fifth plates 110, 120, 130, 140 and 150 may have different shapes. Therefore, positions of the first to fifth plates 110, 120, 130, 140, and 150 may necessarily be laminated or stacked to correspond to or be aligned with each other. In the heat exchange member 100 according to this embodiment, the first to fifth guide portions 115, 125, 135, 145, and 155 may be provided at the sides of the first to fifth plates 110, 120, 130, 140, and 150, to guide or align the first to fifth plates 110, 120, 130, 140, and 150 at desired positions. For example, the first to fifth guide portions 115, 125, 135, 145, and 155 may be formed in the shape of a groove or hole.

The heat exchange member 100 may have an inlet 21 (into which the refrigerant is flowable) and an outlet 22 (through which the refrigerant is dischargeable to an outside thereof). The outlet 22 may be adjacent to bottom surfaces 10a of the plurality of battery cells 10 at one side of the heat exchange member 100 (e.g., at one end of the stacked plurality of battery cells 10), and the inlet 21 may be below the outlet 22 and may be spaced apart from the outlet 22 (e.g., the outlet 22 may be aligned with the inlet 21 and the outlet may be closer to the battery cells 10 than the inlet 21). For example, the refrigerant may be flowable in the heat exchange member 100 through the inlet 21 and then dischargeable to the outside of the exchange member 100 through the outlet 22 by passing through the first and second refrigerant flow paths 122 and 142. The refrigerant may pass through the inlet 21 (at a relatively lower portion of the heat exchange member 100), may pass through the second refrigerant flow path 142, and may then be discharged to the outside of the heat exchange member 100 through the outlet 22 by passing through the first refrigerant flow path 122. A temperature of the refrigerant may be lowest in the inlet 21 and be highest in the outlet 22.

Figure 2:
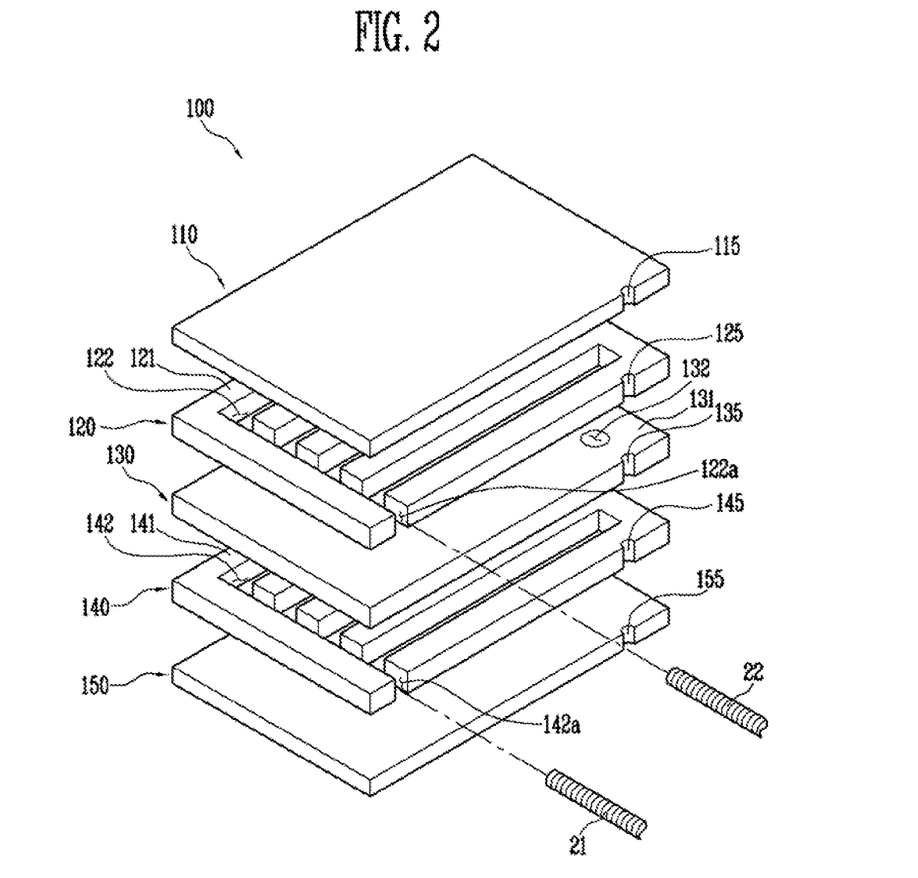
FIG. 2 illustrates an exploded perspective view of a heat exchange member of FIG. 1A.
Figure 3:
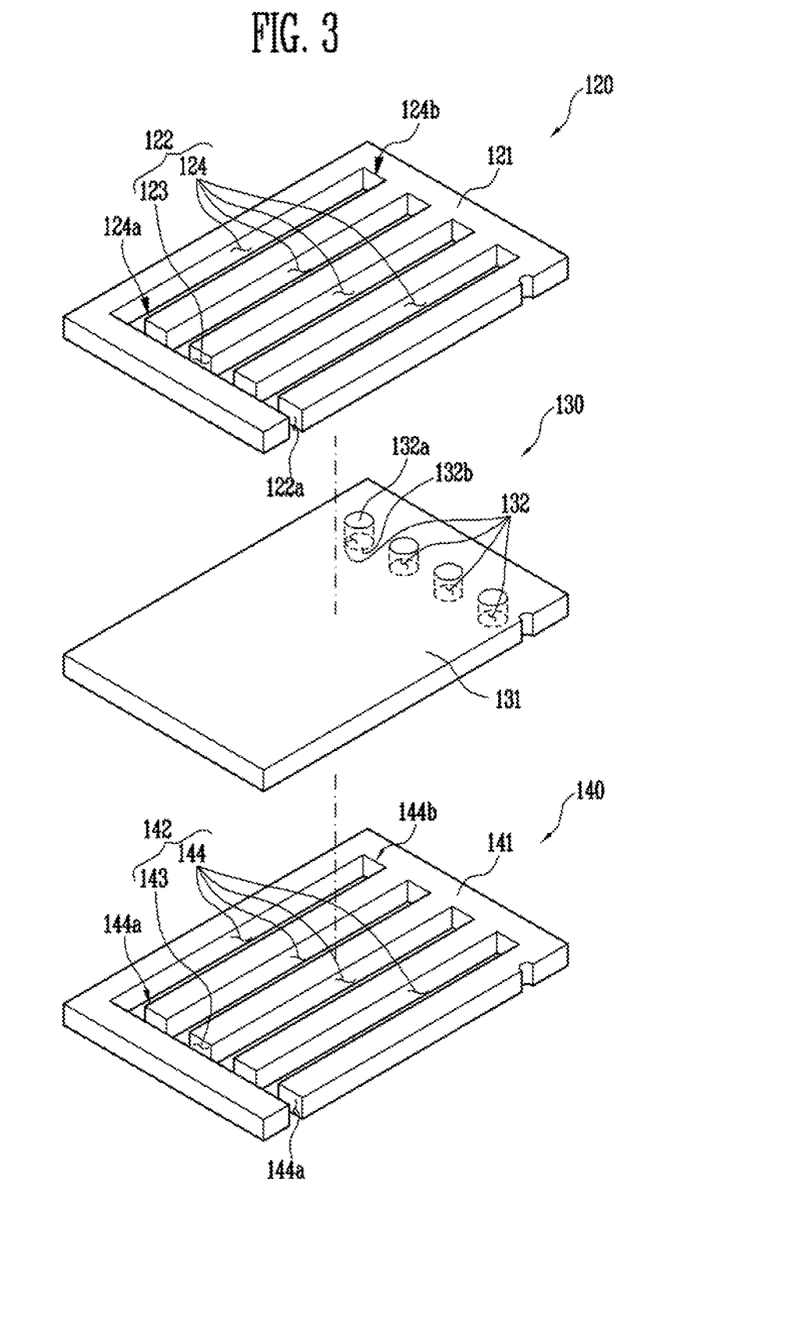
FIG. 3 illustrates a perspective view of second to fourth plates of the heat exchange member of FIG. 2.

FIG. 2 illustrates an exploded perspective view of the heat exchange member of FIG. 1A. FIG. 3 illustrates a perspective view of the second to fourth plates of the heat exchange member of FIG. 2.

Referring to FIGS. 2 and 3, the heat exchange member 100 according to this embodiment may include the first and second refrigerant flow paths 122 and 142 (through which the refrigerant is flowable). The first and second refrigerant flow paths 122 and 142 may be between a plurality of layers. For example, the heat exchange member 100 may include the first to fifth plates 110, 120, 130, 140, and 150 that are sequentially laminated starting adjacent to the bottom surface of the battery cells. In this case, the first and second refrigerant flow paths 122 and 142 may be respectively in the second and fourth plates 120 and 140, and the third plate 130 may be between the first and second refrigerant flow paths 122 and 142.

The first refrigerant flow path 122 may be in the second plate 120, and the second refrigerant flow path 142 may be in the fourth plate 140. The second plate 120 may include a base portion 121 and a hole passing through the base portion 121. The fourth plate 140 may also include a base portion 141 and a hole passing through the base portion 141. The third plate 130 may be between the second and fourth plates 120 and 140, and the first and fifth plates 110 and 150 may be at outer sides of the second and fourth plates 120 and 140. For example, the holes in the base portions 121 and 141 of the second and fourth plates 120 and 140 may be blocked by the first, third, and fifth plates 110, 130, and 150, to act as the first and second refrigerant flow paths 122 and 142. For example, the holes that pass through the base portions 121 and 141 of the second and fourth plates 120 and 140 may be operated as paths through which the refrigerant flows by the first, third, and fifth plates 110, 130, and 150. In addition, an opening or entrance 122a of the first refrigerant flow path 122 may be connected to or in fluid communication with the outlet 22, and an opening or entrance 142a of the second refrigerant flow path 142 may be connected to or in fluid communication with the inlet 21.

In an implementation, the first to fifth plates 110, 120, 130, 140, and 150 may include aluminum, e.g., A3003, as a base metal. Among these plates, the second and fourth plates 120 and 140 may be provided by further coating a metal, e.g., A4343 or A4045, on the base metal. For example, the second and fourth plates 120 and 140 may be provided so that two or more kinds of metals are clad. In this case, the metal clad as a thin plate on an outer surface of the base metal may melt at a temperature lower than that of the base metal. If the first to fifth plates 110, 120, 130, 140, and 150 are laminated along the first to fifth guide portions 115, 125, 135, 145, and 155 and then heated in an oven of 500 to 600° C., the clad metals of the second and fourth plates 120 and 140 may be melted so that the first to fifth plates 110, 120, 130, 140 and 150 may be integrally connected. For example, the outer circumferential sides of the first to fifth plates 110, 120, 130, 140, and 150 are welded, so that the heat exchange member 100 may be more firmly fixed. The second and fourth plates 120 and 140 may be provided as clad-type plates and/or the outer circumferential sides of the first to fifth plates 110, 120, 130, 140 and 150 may be welded so that the heat exchange member 100 may be firmly fixed. In an implementation, the heat exchange member 100 may be firmly fixed in only one of the two manners described above.

The first refrigerant flow path 122 may include a straight line shaped first main path 123 (connected to or in fluid communication with the outlet 122), and one or more first bridge paths 124 (vertically or orthogonally extending from the first main path 123 and connected to or in fluid communication with the first main path 123). The second refrigerant flow path 142 may include a straight line shaped second main path 143 (connected to or in fluid communication with the inlet 21) at a position corresponding to, underlying, or aligned with the first main path 123, and one or more second bridge paths 144 (vertically or orthogonally extending from the second main path 143 and connected to or in fluid communication with the second main path 143). For example, the first and second main paths 123 and 143 may extend in a second direction (Y-direction, see FIG. 1A) to be parallel with a lengthwise direction of the bottom surface of each battery cell. For example, the second direction may be a direction perpendicular to the first direction (e.g., the first direction being the direction in which the battery cells are aligned). The first bridge paths 124 may extend in the first direction (X-direction, see FIG. 1A) and may be spaced apart from each other, and the second bridge paths 144 may extend in the first direction and may be spaced apart from each other. For example, the second bridge paths 144 may correspond to, underlie, or be aligned with the first bridge paths 124.

The third plate 130 may include a base portion 131 and through-holes 132 that pass through the base portion 131. The through-holes 132 may be connected or may extend from an upper surface to an lower surface, (e.g., outer surfaces) of the third plate 130. The third plate 130 may be between the second and fourth plates 120 and 140. The second plate 120 may be on the upper surface of the third plate 130, and the lower surface of the third plate 130 may cover the fourth plate 140. For example, the through-holes 132 may be at positions corresponding to or aligned with second or other ends 124b and 144b of the first and second bridge paths 124 and 144. For example, first or one ends 124a and 144a of the first and second bridge paths 124 and 144 may be connected to or in fluid communication with the first and second main paths 123 and 143, and the second or other ends 124b and 144b of the first and second bridge paths 124 and 144 may be connected to or in fluid communication with one side 132a and/or another side 132b of the through-hole 132. For example, the through-holes 132 may extend in a vertical or orthogonal direction with respect to the first and second bridge paths 124 and 144 (which are in parallel at upper and lower portions of the heat exchange member 100), to connect the first and second bridge paths 124 and 144 to each other, e.g., such that the first and second bridge paths 124 and 144 are in fluid communication with one another.

Figure 4:
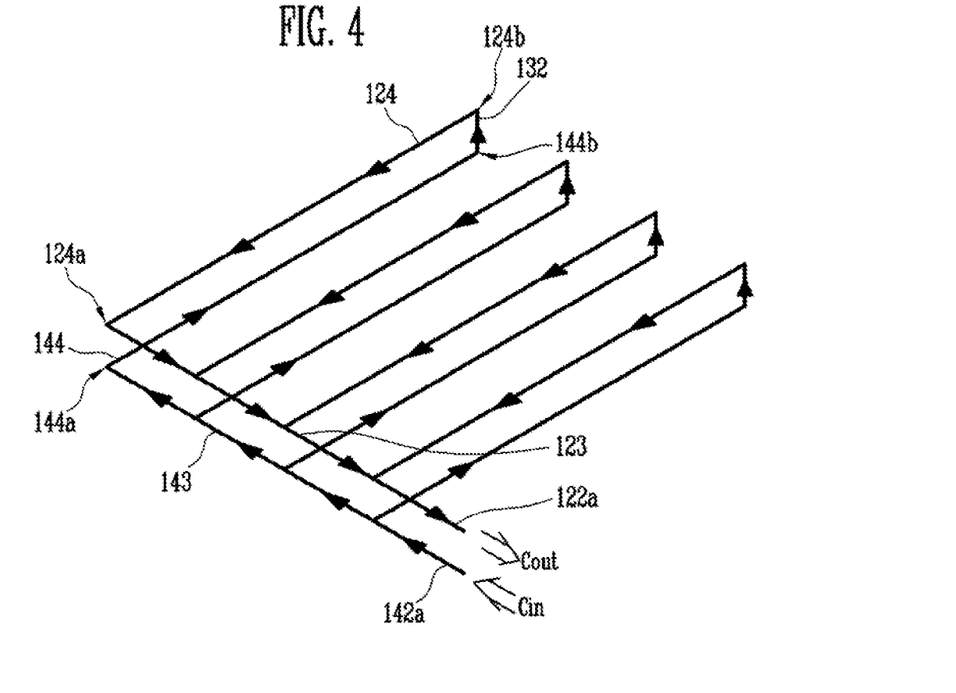
FIG. 4 illustrates a view schematically showing a flow of a refrigerant according to an embodiment.

FIG. 4 illustrates a view schematically showing a flow of a refrigerant according to an embodiment.

Referring to FIG. 4 together with FIGS. 2 and 3, the first refrigerant flow path 122 may be connected from one end to another end thereof. For example, the first refrigerant flow path 122 may continuously extend form one end to the other end thereof. For example, the one end (that is the entrance 122a of the first refrigerant flow path 122) may be connected to the outlet 22 (through which the refrigerant is discharged to the outside of the heat exchange member 100). The second refrigerant flow path 142 may be connected from one end to another end thereof. For example, the second refrigerant flow path 142 may continuously extend form one end to the other end thereof. For example, the one end (that is the entrance 142a of the second refrigerant flow path 142) may be connected to the inlet 21 (through or into which the refrigerant flows in the heat exchange member 100). In the process in which the refrigerant passes from the inlet 21 to the outlet 22, a temperature of the refrigerant may be increased, and a phase (e.g., phase of matter or state of matter) of the refrigerant may be changed. In an implementation, the refrigerant may include, e.g., R134a or 1234YF.

The refrigerant may flow into the heat exchange member 100 through the inlet 21 in the fourth plate 140, and the temperature of the refrigerant may be increased as the refrigerant passes through the second refrigerant flow path 142 (at the lower portion of the heat exchange member 100). Subsequently, the refrigerant may pass through the first refrigerant flow path 122 (at the upper portion of the heat exchange member 100) by passing through the through-hole 132 in the third plate 130. Thus, the refrigerant passing through the first refrigerant flow path 122 may help control the temperature of the battery cell by exchanging heat with the battery cell.

The phase of the refrigerant passing through the first refrigerant flow path 122 may be changed while the refrigerant exchanges heat with the battery cell. For example, liquid phase refrigerant may flow into the heat exchange member 100 through the inlet 21 to flow along the second refrigerant flow path 142. The phase of at least a portion of the refrigerant may be changed in the first refrigerant flow path 122, e.g., liquid and gas phases of the refrigerant may coexist. If the refrigerant refrigerates or cools the battery cell by exchanging heat with the battery cell in the first refrigerant flow path 122, the phase of the refrigerant may be changed due to the heat obtained from the battery cell, so that the temperature of the refrigerant may be maintained constant. Thus, the temperature of the refrigerant flowing along the second refrigerant flow path 122 may be maintained approximately constant, so that the heat exchange efficiency of the refrigerant with the battery cell may be maintained approximately constant, regardless of the position of the battery cell. As a result, the temperature of the battery module may be maintained approximately constant by decreasing a difference in temperature between the plurality of battery cells.

For example, the refrigerant may be further included in the heat exchange member 100. The refrigerant may be provided to flow in (Cin) the heat exchange member 100 through the inlet 21 and to flow along the second refrigerant flow path 142. The refrigerant may be connected to or may flow to the first refrigerant flow path 122 through the through-hole 132. The refrigerant may exchange heat with the bottom surfaces of the battery cells 10 as the phase of the refrigerant is changed in the first refrigerant flow path 122. In the heat exchange member 100 according to this embodiment, the refrigerant may have its lowest temperature when provided at the inlet 21, and may have its highest temperature when it is discharged (Cout) to the outside of the heat exchange member 100 through the outlet 22.

A difference in temperature of the refrigerant within the heat exchange member and/or a difference in temperature of the refrigerant in the inlet and the outlet may cause a difference in heat exchange efficiency of the battery cell when the refrigerant exchanges heat with the battery cell. On the other hand, the heat exchange member 100 according to this embodiment may be provided such that the inlet 21 and the outlet 22 face each other, so that it is possible to guide heat exchange between the inlet 21 and the outlet 22 and to reduce the difference in temperature of the refrigerant passing through the inlet 21 and the outlet 22. In the heat exchange member 100, the inlet 21 (having a relatively large difference in temperature with respect to operation temperature) may be provided at a position distant or spaced apart from the battery cells, so that it is possible to reduce the difference in temperature among the battery cells 10, which may otherwise be caused by the difference in temperature of the inlet 21. The refrigerant passing through the first refrigerant flow path 122 may receive heat from the battery cells 10, e.g., may exchange heat with the battery cells 10, so that the temperature of the refrigerant may be increased or the phase of the refrigerant may be changed. Thus, the refrigerant in the second refrigerant flowing path 142 (having a relatively low temperature) may exchange heat with refrigerant passing through the first refrigerant flow path 122, so that it is possible to improve the heat exchange efficiency between the refrigerant of the first refrigerant flow path 122 and the battery cells 10. In the heat exchange member 100, the battery cells 10 may exchange heat with the refrigerant in the second refrigerant flow path 142 while exchanging heat with the refrigerant in the first refrigerant flow path 122. Thus, the refrigerant in the heat exchange member 100 may have a relatively small difference in temperature according to the position thereof. Accordingly, it is possible to minimize the heat exchange with an unnecessary or other outside portion or element except the battery cells 10, thereby reducing the total amount of the refrigerant used.

The heat exchange of the battery module 20 according to this embodiment may be efficiently performed by the heat exchange member 100, so that it is possible to prevent a difference in temperature between the battery cells 10 of the battery module 20, which temperature difference could otherwise be generated according to the position of the heat exchange member. A difference in temperature between battery cells may cause a difference in a degree of degradation between the battery cells, which may result in the inequality or non-uniformity of current flow, thereby accelerating reduction in lifespan of the battery module. The heat exchange member 100 according to this embodiment may help reduce or eliminate the difference in temperature between the battery cells 10, so that it is possible to improve heat exchange efficiency and to extend the lifespan of the battery module 20.

Hereinafter, another embodiment will be described with reference to FIGS. 5 to 7. Contents of this embodiment, except the following contents, may be similar to those of the embodiment described with reference to FIGS. 1A to 4, and therefore, repeated detailed descriptions may be omitted.

Figure 5:
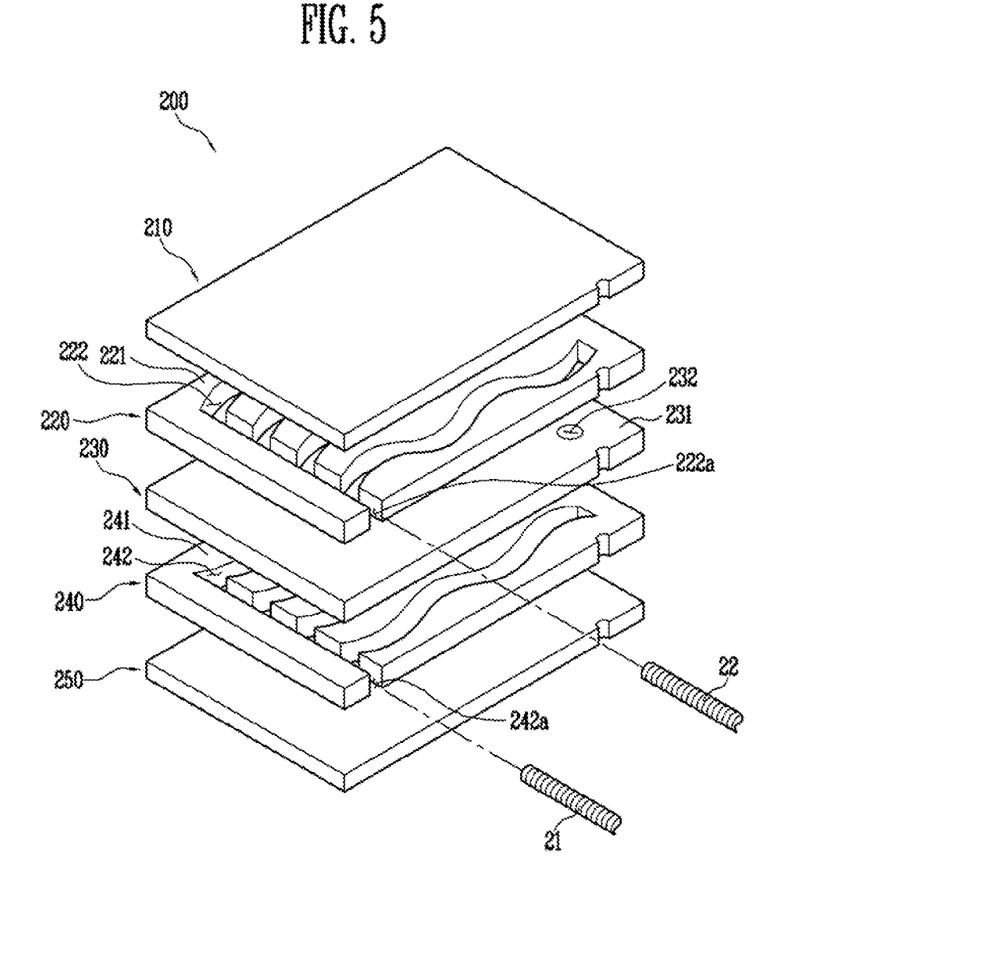
FIG. 5 illustrates an exploded perspective view of a heat exchange member according to another embodiment.

FIG. 5 illustrates an exploded perspective view of a heat exchange member according to another embodiment. FIG. 6 illustrates a perspective view of second to fourth plates of the heat exchange member of FIG. 5. FIG. 7 illustrates a view schematically showing a flow of a refrigerant according to another embodiment.

Figure 6:
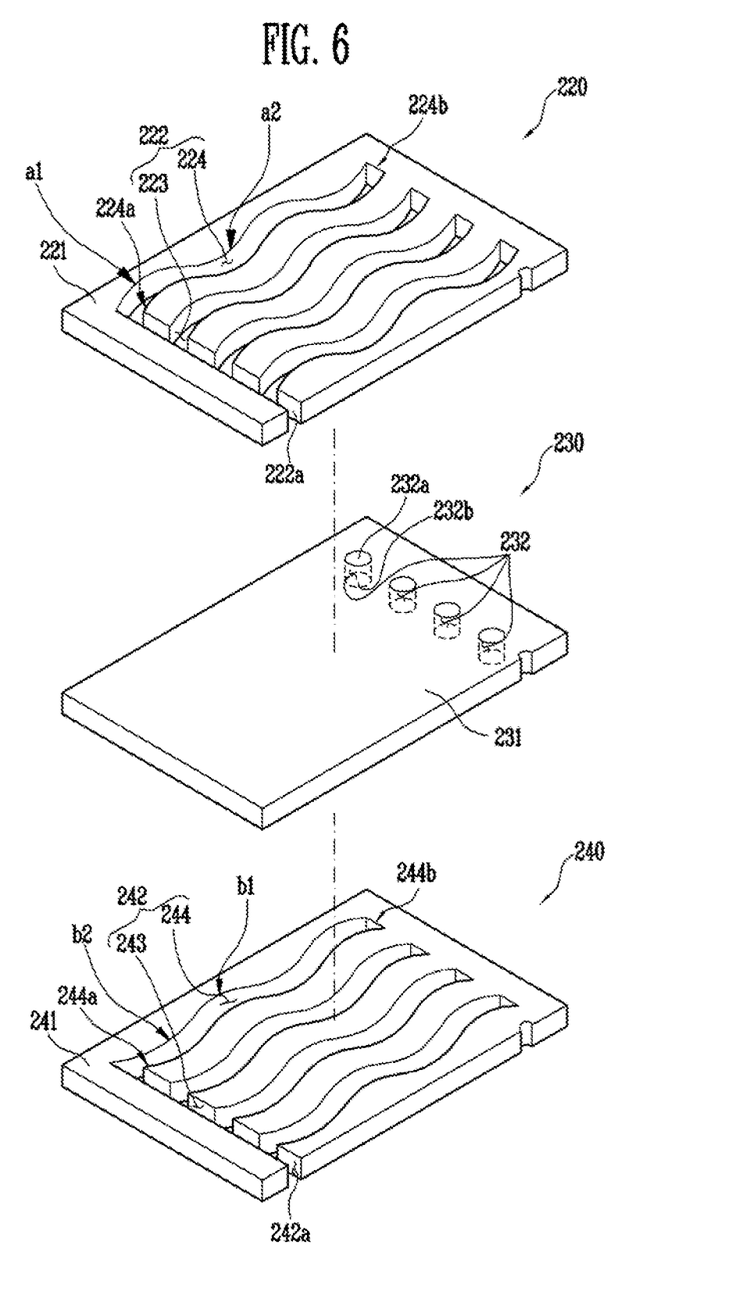
FIG. 6 illustrates a perspective view of second to fourth plates of the heat exchange member of FIG. 5.
Figure 7:
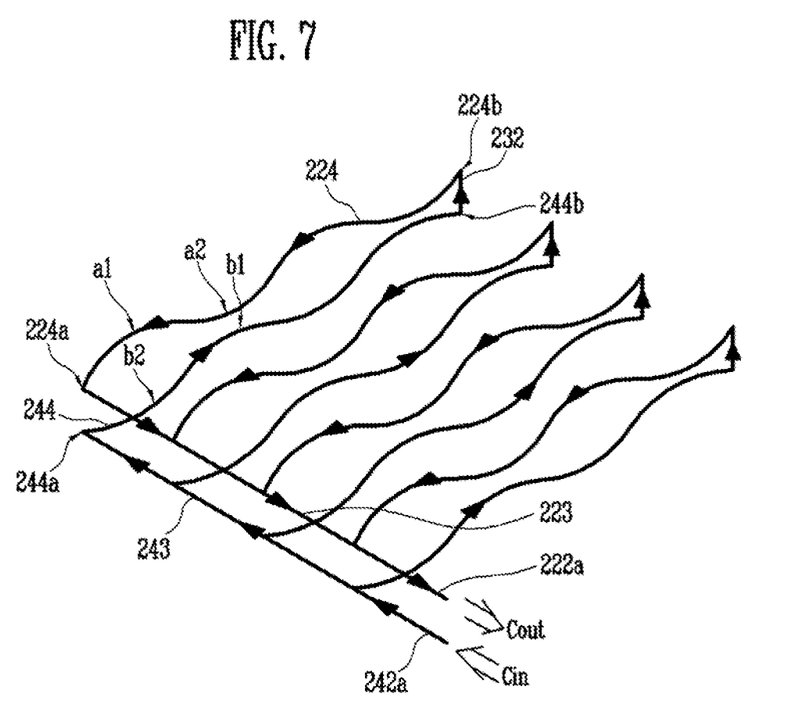
FIG. 7 illustrates a view schematically showing a flow of a refrigerant according to another embodiment.

Referring to FIGS. 5 to 7, the heat exchange member 200 according to this embodiment may control the temperature of battery cells by exchanging heat with the battery cells. First and second refrigerant flow paths 222 and 242 (which are paths through which a refrigerant moves or flows) may be provided inside the heat exchange member 200. The first refrigerant flow path 222 may be adjacent to the battery cell and at an upper portion of the heat exchange member 200, and may exchange heat with the battery cell. The second refrigerant flow path 242 may be at a lower portion of the heat exchange member 200. An inlet 21 may be connected to or in fluid communication with an entrance 242a of the second refrigerant flow path 24, so that the refrigerant may be initially provided into (Cin) the heat exchange member 200. The refrigerant may move from the second refrigerant flow path 242 to the first refrigerant flow path 241 through through-holes 232 that connect the first and second refrigerant flow paths 222 and 242. The refrigerant may be discharged (Cout) to an outside of the heat exchange member 200 through an outlet 22 at an entrance 222a of the first refrigerant flow path 222. The inlet 21 may be at the lower portion of the heat exchange member 200 (e.g., distal to the battery cells), and the outlet 22 may be at the upper portion of the heat exchange member 200 (e.g., proximate to the battery cells). For example, the inlet 21 and the outlet 22 may be at positions corresponding to or aligned with each other, so that heat may be exchanged between the refrigerant in the inlet 21 and the refrigerant in the outlet 22. For example, fresh or new refrigerant may flow into the heat exchange member 200 through the inlet 21, so that the refrigerant having the lowest temperature can be provided. For example, the outlet 22 may be provided with the refrigerant having the highest temperature, which may be discharged after exchanging heat with the battery cells, and may exchange heat with the inlet 21, thereby reducing the difference in temperature of the refrigerant within the heat exchange member 200.

The heat exchange member 200 according to this embodiment may include first to fifth plates 210, 220, 230, 240, and 250 sequentially provided from an upper portion to a lower portion thereof. The first and fifth plates 210 and 250 may be on outermost surfaces of the heat exchange member 200, and may help protect the second to fourth plates 220, 230, and 240 inside the heat exchange member 200. The second and fourth plates 220 and 240 may include base portions 221 and 241 and holes passing through the base portions 221 and 241. The first and third plates 210 and 230 may be on the top and bottom, e.g., on outer sides, of the second plate 220, so that the hole of the base portion 221 may be blocked or contained by the first and third plates 210 and 230. The blocked hole may act as the first refrigerant flow path 222 for the refrigerant at the upper portion of the heat exchange member 200. Similarly, the fourth plate 240 may be provided with the second refrigerant flow path 242 by the third and fifth plates 230 and 250. The third plate 230 may include a base portion 231 and through-holes 232 passing through the base portion 231. For example, the through-holes 232 may connect the flow of the refrigerant, e.g., may provide a fluid communication link, between the first and second refrigerant flow paths 222 and 242.

At least one portion of the first or second refrigerant flow path 222 or 242 according to this embodiment may include or may have a wave or zigzag shape. In an implementation first refrigerant flow path 222 may include a straight line shaped first main path 223 (extending in parallel with the lengthwise direction of the bottom surface of each battery cell), and one or more bridge paths 224 connected or in fluid communication with the main path 223 and extending in the first direction (e.g., the direction vertical or orthogonal with respect to the direction that is parallel to the lengthwise direction of bottom surface of each battery cell) from the first main path 223. The second refrigerant flow path 242 may include a straight line shaped second main path 243 (extending in parallel with the lengthwise direction of the bottom surface of each battery cell) to correspond to, to underlie, or to be aligned with the first main path 223, and one or more bridge paths 244 connected or in fluid communication with the second main path 243 and extending in the first direction from the second main path 243.

For example, the first and second bridge paths 224 and 244 may have the wave or zigzag shape. The first and second bridge paths 224 and 244 may include convex portions a1 and b1 protruding in the second direction (perpendicular to the first direction), and concave portions a2 and b2 alternately provided with the convex portions a1 and b1. The convex portion a1 of the first refrigerant flow path 222 may be provided at a position corresponding to, overlying, or aligned with the concave portion b2 of the second refrigerant flow path 242. The concave portion a2 of the first refrigerant flow path 222 may be provided at a position corresponding to, overlying, or aligned with the convex portion b1 of the second refrigerant flow path 242. For example, the convex portions a1 and concave portions a2 of the first refrigerant flow path 222 may be offset relative to the convex portions b1 and the concave portions b2 of the second refrigerant flow path 242.

The first and second refrigerant flow paths 222 and 242 may have the wave or zigzag shape, so that it is possible to extend the flow path of the refrigerant in the heat exchange member 200 without increasing the volume of the heat exchange member 200, thereby improving the use efficiency of the refrigerant. Further, the first and second refrigerant flow paths 222 and 242 may be provided at positions corresponding to or aligned with each other, to exchange heat with each other. Thus, while the refrigerant of the first refrigerant flow path 222 may receive heat from the battery cell, the refrigerant of the second refrigerant flow path 242 may remove the heat of the refrigerant of the first refrigerant flow path 222. Accordingly, it is possible to maintain the temperature of the refrigerant of the first refrigerant flow path 222 to be relatively low, thereby improving the heat exchange efficiency of the heat exchange member 200 with the battery cell.

The convex and concave portions a1 and a2 of the first refrigerant flow path 222 may be alternately provided, and the convex and concave portions b1 and b2 of the second refrigerant flow path 242 may be alternately provided. For example, the concave portion b2 of the second refrigerant flow path 242 may be below or may underlie the convex portion a1 of the first refrigerant flow path 222, and the convex portion b1 of the second refrigerant flow path 242 may be below or may underlie the concave portion a2 of the first refrigerant flow path 222. For example, the first and second refrigerant flow paths 222 and 242 may have the convex portions a1 and b1 and the concave portions a2 and b2 intersecting each other in the opposite directions. The first and second refrigerant flow paths 222 and 242 provided as described above may help increase the distance or area where heat is exchanged between the first and second refrigerant flow paths 222 and 242, so that it is possible to precisely control the heat exchange between the battery cell and the first refrigerant flow path 222 and the heat exchange between the refrigerants respectively passing through the first and second refrigerant flow paths 222 and 242.

The refrigerant according to an embodiment may flow into the heat exchange member 200 through the inlet 21 to pass through the second main path 243, and may pass through one end 244a of the second bridge path 244 connected to or in fluid communication with the second main path 243 by passing through the second main path 243. The refrigerant may flow to the other end 224b of the first bridge path 224 through the through-hole 232 connected to or in fluid communication with the other end 244b of the second bridge path 244 by passing through the second bridge path 244, and may be discharged to the outlet 22 through the first main path 223 that is connected to or in fluid communication with one end 224a of the first bridge path 224 by passing through the first bridge path 224.

The refrigerant in the liquid phase may flow in the heat exchange member 200 and may exchange heat with the refrigerant in the second refrigerant flow path 242 while passing through the second refrigerant flow path 242 (including the second main path 243 and the second bridge path 244), thereby increasing the temperature of the refrigerant. The refrigerant may be changed from the liquid phase into the gas phase by moving to the first refrigerant flow path 222 and then exchanging heat with the battery cells.

By way of summation and review, a battery module may be configured with a plurality of battery cells, and the battery cell may transmit energy to an external electronic device through an electrochemical reaction. In this case, the battery cell may generate heat during the electrochemical reaction. In a case where the heat is accumulated, the battery cell may be deteriorated, and the safety of the battery cell may be compromised in a serious case. Controlling the temperature of the battery cell has been considered.

The embodiments may provide a battery module having improved heat exchange efficiency.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery module, comprising:
a plurality of battery cells aligned in a first direction;
a heat exchange member supporting a bottom surface of each battery cell of the plurality of battery cells, the heat exchange member exchanging heat with the plurality of battery cells,
wherein:
the heat exchange member includes a first refrigerant flow path and a second refrigerant flow path,
the first refrigerant flow path is adjacent to the bottom surface of each battery cell,
the second refrigerant flow path is spaced apart from the first refrigerant flow path and below the first refrigerant flow path,
the heat exchange member has an inlet into which a refrigerant is flowable and an outlet through which the refrigerant is dischargeable to an outside of the heat exchange member,
the outlet is adjacent to the bottom surface of each battery cell and at a side of the heat exchange member, and
the inlet is below the outlet and spaced apart from the outlet.

2. The battery module as claimed in claim 1, wherein:
the heat exchange member includes a plurality of layers formed by sequentially laminating first to fifth plates,
the first plate is adjacent to the bottom surface of each battery cell,
the first flow path is in the second plate,
the third plate is between the second and fourth plates,
the second refrigerant flow path is in the fourth plate, and
the fifth plate is beneath the fourth plate.

3. The battery module as claimed in claim 2, wherein outer circumferential sides of the first to fifth plates are integrally connected through welding.

4. The battery module as claimed in claim 2, wherein:
the first refrigerant flow path continuously extends from one end thereof to another end thereof, the one end of the first refrigerant flow path being connected to the outlet, and
the second refrigerant flow path continuously extends from one end thereof to another end thereof, the one end of the second refrigerant flow path being connected to the inlet.

5. The battery module as claimed in claim 4, wherein:
the third plate includes a through-hole extending from an upper surface thereof to a lower surface thereof, and
the other ends of the first and second refrigerant flow paths are connected to the through-hole in the third plate.

6. The battery module as claimed in claim 2, wherein:
the second plate includes the outlet through which the refrigerant is dischargeable to an outside of the heat exchange member,
the fourth plate includes the inlet into which the refrigerant is flowable, and
a phase of the refrigerant is changeable by passing from the inlet to the outlet.

7. The battery module as claimed in claim 6, wherein:
refrigerant in a liquid phase is flowable in the heat exchange member through the inlet and along the second refrigerant flow path, and
the phase of the refrigerant is changeable in the first refrigerant flow path such that both liquid and gas phases are flowable in the first refrigerant flow path.

8. The battery module as claimed in claim 2, wherein:
the first refrigerant flow path includes:
  a straight line shaped first main path connected to the outlet, and
  one or more first bridge paths connected to and extending in an orthogonal direction from the first main path, and
the second refrigerant flow path includes:
  a straight line shaped second main path connected to the inlet and at a position underlying the first main path, and
  one or more second bridge paths connected to and extending in an orthogonal direction from the second main path.

9. The battery module as claimed in claim 8, wherein the first and second main paths extend in a second direction in parallel with a lengthwise direction of the bottom surface of the battery cell, the second direction being perpendicular to the first direction.

10. The battery module as claimed in claim 9, wherein:
the one or more first bridge paths includes a plurality of first bridge paths that extend in the first direction and that are spaced apart from each other, and
the one or more second bridge paths includes a plurality of second bridge paths that extend in the first direction and that are spaced apart from each other, the one or more second bridge paths underlying the one or more first bridge paths.

11. The battery module as claimed in claim 10, wherein:
the third plate includes a through-hole extending from an upper surface to a lower surface thereof,
one end of the one or more first bridge paths is connected to the first main path,
one end of the one or more second bridge paths is connected to the second main path, and
other ends of the one or more first bridge paths and the one or more second bridge paths are connected to one another via the through hole.

12. The battery module as claimed in claim 11, further comprising the refrigerant,
wherein:
the refrigerant flows into the heat exchange member through the inlet to flow along the second refrigerant flow path,
the refrigerant flows to the first refrigerant flow path through the through-hole, and
the refrigerant exchanges heat with the bottom surface of each battery cell, a phase of the refrigerant being changed in the first refrigerant flow path.

13. The battery module as claimed in claim 2, wherein:
the first to fifth plates include first to fifth guide portions at sides thereof, and
the first to fifth guide portions are at positions that are aligned with each other, the first to fifth guide portions guiding positions of the first to fifth plates.

14. The battery module as claimed in claim 2, wherein at least one portion of the first or second refrigerant flow path has a wave or zigzag shape.

15. The battery module as claimed in claim 14, wherein:
the first refrigerant flow path includes:
  a straight line-shaped first main path that extends in parallel with a lengthwise direction of the bottom surface of each battery cell, and
  one or more first bridge paths that are connected to the first main path and that extend the first direction from the first main path, and
the second refrigerant flow path includes:
  a straight line shaped second main path that extends in parallel with the lengthwise direction of the bottom surface of each battery cell and that is aligned with the first main path, and
  one or more second bridge paths that are connected to the second main path and that extend in the first direction from the second main path.

16. The battery module as claimed in claim 15, wherein:
the one or more first and second bridge paths have the wave or zigzag shape,
each of the first and second bridge paths includes:
  a convex portion protruding in a second direction that is perpendicular to the first direction, and
  a concave portion alternately arranged with the convex portion, and
the convex portion of the first refrigerant flow path is at a position overlying the concave portion of the second refrigerant flow path.

17. The battery module as claimed in claim 2, wherein at least one of the first to fifth plates includes aluminum.

18. A battery module, comprising:
a plurality of battery cells aligned in a first direction;
a heat exchange member supporting a bottom surface of each battery cell of the plurality of battery cells, the heat exchange member exchanging heat with the plurality of battery cells,
wherein:
the heat exchange member includes a first refrigerant flow path and a second refrigerant flow path,
the first refrigerant flow path is adjacent to the bottom surface of each battery cell,
the second refrigerant flow path is spaced apart from the first refrigerant flow path and below the first refrigerant flow path,
the first refrigerant flow path includes:
  a straight line shaped first main path connected to an outlet, and
  one or more first bridge paths connected to and extending in an orthogonal direction from the first main path, and
the second refrigerant flow path includes:
  a straight line shaped second main path connected to an inlet and at a position underlying the first main path, and
  one or more second bridge paths connected to and extending in an orthogonal direction from the second main path.

19. A battery module, comprising:
a plurality of battery cells aligned in a first direction;

a heat exchange member supporting a bottom surface of each battery cell of the plurality of battery cells, the heat exchange member exchanging heat with the plurality of battery cells, wherein:

the heat exchange member includes a first refrigerant flow path and a second refrigerant flow path, the first refrigerant flow path is adjacent to the bottom surface of each battery cell, the second refrigerant flow path is spaced apart from the first refrigerant flow path and below the first refrigerant flow path, the first refrigerant flow path includes:
   a straight line-shaped first main path that extends in parallel with a lengthwise direction of the bottom surface of each battery cell, and
   one or more first bridge paths that are connected to the first main path and that extend the first direction from the first main path, and the second refrigerant flow path includes:
   a straight line shaped second main path that extends in parallel with the lengthwise direction of the bottom surface of each battery cell and that is aligned with the first main path, and
   one or more second bridge paths that are connected to the second main path and that extend in the first direction from the second main path.

* * * * *